FREQUENCY CONTROL CIRCUIT

Filed June 25, 1971

INVENTOR.
A. Hans Bott

BY Hill, Sherman, Meroni, Gross & Simpson
ATTORNEYS

1

3,706,039
FREQUENCY CONTROL CIRCUIT

A. Hans Bott, Quincy, Ill., assignor to Harris Intertype Corporation, Cleveland, Ohio Filed June 25, 1971, Ser. No. 156,800
Int. Cl. H03b *3/06;* H04b *1/04;* H04n *5/38*
U.S. Cl. 325—184 8 Claims

ABSTRACT OF THE DISCLOSURE

A frequency control circuit utilizing a pair of oscillators operating at different frequencies as the signal source for a television transmitter. The outputs of the two oscillators are mixed together to provide a difference frequency from which is derived the final output transmitting frequency. Also, the difference frequency is coupled to a phase detector where it is compared with a signal derived from a precision reference source. Deviation between the two inputs to the phase detector result in an error signal which is then coupled to one of the two oscillators to control the frequency thereof so that the two inputs to the phase detector have substantially equal frequencies.

BACKGROUND OF THE INVENTION

Description of the prior art

In prior art arrangements it is common to utilize a reference frequency source as the means for directly deriving the carrier signal. In such circuits the reference signal is simply multipled to the desired carrier frequency. In such arrangements, failure of the reference frequency, which is a likely failure, puts the transmitter out of operation. The present circuit eliminates such failure and provides a frequency control circuit which is highly stable, regulating frequencies as high as 900 mHz. to an accuracy of 1 Hz.

Field of the invention

The field of art to which this invention pertains is frequency control circuits and in particular to frequency control circuits which are producing a high degree of frequency stability, and especially to frequency control circuits for use in television transmitters.

SUMMARY OF THE INVENTION

It is a principal feature of the present invention to provide an improved frequency control circuit for a television transmitter.

It is also a feature of the present invention to provide a frequency control circuit which is failsafe.

It is a principal object of the present invention to provide a frequency control circuit for a television transmitter which is highly stable and which utilizes only a single precision reference frequency source.

It is another object of the present invention to provide a frequency control circuit for a television transmitter which utilizes a pair of oscillators at different frequencies and which uses a difference frequency between the outputs of the oscillators as an input to a phase detector for comparing with an input derived from a precision reference source to develop an error signal to control one of the two oscillators.

It is another object of the present invention to provide a frequency control circuit as described above wherein the outputs of the two oscillators are mixed and the difference frequency is used directly as a means for supplying the output signal of the television transmitter.

It is also an object of the present invention to provide a frequency control circuit as described above wherein an amplitude modulator is inserted between one of the

2 oscillators and the point at which the oscillator signal is mixed with the other oscillator signal.

It is also an object of the present invention to provide a frequency control circuit as described above wherein a programmed decade divider is provided between the source of the difference frequency signal and the phase detector.

These and other objects, features and advantages of the present invention will be understood from the following drawing and the associated description wherein reference numerals are utilized to designate a preferred embodiment.

DESCRIPTION OF THE PREFERRED EMBODIMENT

The present invention relates to a frequency control circuit utilizing first and second oscillators at different frequencies as the means for supplying the transmitter carrier signal. The two oscillators have outputs which are beat together to develop a difference frequency. The transmitter output is then derived from this difference frequency.

The outputs of the two oscillators are also coupled to a mixing circuit which develops a difference frequency which in turn is ultimately coupled to one of the inputs of a phase detector. The other input of the phase detector is derived from a precision reference frequency source, and the phase detector produces an output signal which is indicative of the deviation in frequency between the two inputs. This output signal is then used to control one of the two main oscillators.

Also, the amplitude modulation occurs at the output of one of the oscillators and prior to the point where the two oscillator signals are beat to provide the difference frequency.

The circuit of the present invention minimizes cochannel interference. Television stations are often operated on slightly off-set visual carriers which are very precisely controlled in frequency. Typical stability requirements are 2 Hz. tolerance. The present circuit permits such precise control in a television transmitter employing IF modulation by using phase-lock techniques.

Figure 1:
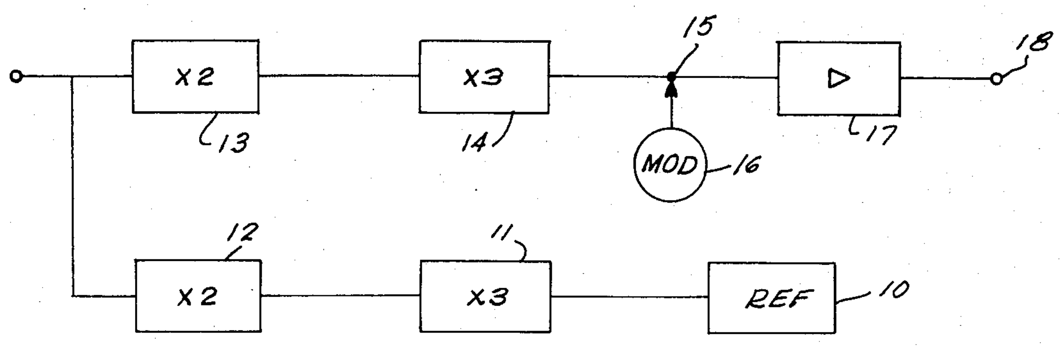
Fig-1 (PRIOR ART)
FIG. 1 illustrates the operation of a prior art circuit wherein the reference frequency source is used as the source for the output of the transmitter.

By referring to the drawings in greater detail, FIG. 1 shows a prior art arrangement wherein a reference frequency standard 10 is shown to provide the output carrier signal for the transmitter. In particular, the reference frequency 10 is coupled to a series of frequency multipliers 11, 12, 13 and 14. The signal may be modulated at a circuit point 15 by a modulator 16 and then coupled to an amplifier 17 and to a ciricuit output point 18. Regardless of the method used to produce frequency control in a circuit of the type shown in FIG. 1, failure of the reference standard 10 will put the transmitting station out of operation. This is because there is a direct coupling from the reference 10 to the transmitter output.

Figure 2:
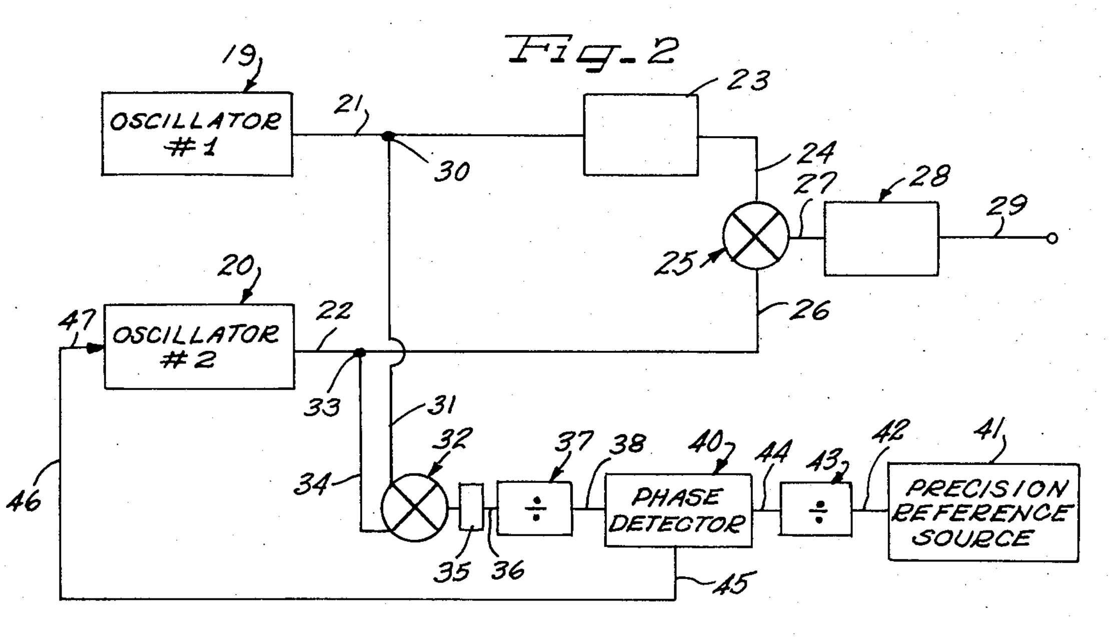
FIG. 2 shows a frequency control circuit according to the present invention wherein the transmitter output signal is derived from a pair of oscillators and not from a precision reference frequency source, and wherein the output of two of the oscillators is used as an input to a phase detector with the phase detector providing a signal to control only one of the oscillators.

In FIG. 2, the circuit of the present invention is shown to be arranged in such a way that even failure of the reference frequency will not put the television transmitting station out of operation. This is because the reference frequency is utilized only as a control in a phase-lock system, and is kept separate from the main circuit which is used to derive the signal which is used at the output of the transmitter.

Specifically, in FIG. 2 a pair of oscillators 19 and 20 are provided. The oscillator 19 may be a crystal oscillator oscillating at a frequency of 37 mHz. The oscillator 20 may be a crystal oscillator oscillating at a frequency of 92.25 mHz.

The oscillators 19 and 20 have outputs at circuit points 21 and 22 at the indicated frequencies. The output 21 is coupled to a modulator 23 which in turn is coupled to an input 24 of a mixer 25. The mixer 25 has a further input 26 which is derived directly from the output 22 of the oscillator 20.

The mixer 25 has an output 27 which is coupled to a filter 28. The output of the filter at 29 then has a frequency which corresponds to the difference frequency between the outputs of the oscillators 19 and 20. In particular, the frequency at the output 29 would be 55.25 mHz. in the example given.

The output of the oscillator 19 is sampled at a circuit point 30 and is coupled through a circuit line 31 to a mixer 32. Likewise the output of the oscillator 20 is sampled at a circuit point 33 and coupled through a line 34 to the mixer 32. The output of the mixer 32 is coupled to a filter 35, and a difference frequency, also of 55.25 mHz. is derived at a circuit point 36. Circuit point 36 is coupled to the input of a programmed decade divider 37 and the output of the divider 37 is coupled to an input 38 of a phase detector 40.

A precision reference source 41 is provided as shown having an output at 42 coupled to a divider 43. The output of the divider is then coupled to an input 44 of the phase detector 40. The precision reference frequency source may be a reference oscillator of 5 mHz. In this case, the frequency divider would be a divider of a factor of 10,000. Accordingly, the signal appearing at the input 44 of the phase detector would be 500 Hz. Likewise, the programmed decade divider 37 would be set so that under normal operating conditions a signal of 500 Hz. would be found at the input 38 of the phase detector.

When the inputs 38 and 44 of the phase detector are each 500 Hz., in this example, the output of the phase detector at a ciricuit point 45 would be zero. Circuit point 45 is coupled through a circuit line 46 to an input 47 of the oscillator 20. In this case the operation of the phase detector would have no effect on the oscillator 20. However, if for some reason the frequency difference at the circuit point 36 varied so that a signal different from 500 Hz. appeared at the circuit point 38, the phase detector would produce an output which would vary the operation of the oscillator 20 to produce a different output at the circuit point 22 so as to equalize the phase detector inputs 38 and 44.

In considerating the operation of FIG. 2, it can be seen that the oscillators 19 and 20 are used as the sources for the transmitter output signal. The oscillators produce a difference signal at the output of the filter 28, and the transmitter output signal is derived from that difference signal. Also, it can be understood that the operation of the precision reference frequency source 41 is not critical to the operation of the transmitter, and failure of the reference source will only mean failure of the phase loop control, and not failure of the output signal of the transmitter.

It will be apparent that there are modifications of the circuit shown in FIG. 2 which can be accomplished without departing from the basic spirit and scope of this invention as claimed herein.

I claim as my invention:

1. In a television transmitter, a precision frequency control circuit comprising:
first and second oscillators,
means for mixing outputs of the two oscillators to derive a difference frequency,
a phase detector,
means for coupling a first signal derived from the difference frequency to an input of said phase detector,
a precision reference frequency source,
means for coupling a second signal derived from said precision reference frequency source to another input of said phase detector,
said phase detector producing an output control signal which is responsive to the frequency and phase deviation of said first signal from said second signal, said output control signal being coupled to one of said oscillators for controlling the frequency thereof so as to cause the signals at said two inputs of said phase detector to have substantially the same frequency, and
means utilizing a signal derived from said two oscillators as the output signal for the transmitter.

2. A precision frequency control circuit in accordance with claim 1 wherein means are provided to amplitude modulate the output of one of said oscillators prior to the point of mixing with the output of the other oscillator.

3. A precision frequency control circuit in accordance with claim 2 wherein unmodulated signals from said first and second oscillators are fed to said mixing means to derive a difference signal.

4. A precision frequency control circuit in accordance with claim 1 wherein a programmed divider is provided between the output of said mixing means and the input of said phase detector.

5. In a television transmitter, a precision frequency control circuit comprising:
first and second oscillators having different frequency output signals,
means for developing a difference frequency signal from said two output signals,
a frequency standard, and
means for comparing a signal derived from the difference frequency signal with a signal derived from the standard for developing a control signal to regulate the frequency of one of said first and second oscillators.

6. A precision frequency control circuit in accordance with claim 5 wherein a second mixing means is provided for developing a difference frequency signal and wherein amplitude modulation means is provided between one of said oscillators and said second mixing means.

7. A precision frequency control circuit in accordance with claim 6 wherein the transmitter output signal is derived from said second mixing means.

8. A precision frequency control circuit in accordance with claim 7 wherein said means for comparing said signal derived from the difference frequency signal with a signal derived from the standard, comprises a phase detector.

References Cited

UNITED STATES PATENTS

| | | | |
|---|---|---|---|
| 3,146,398 | 8/1964 | Schnädelbach | 325—184 |
| 3,378,774 | 4/1968 | Leypold | 325—184 |
| 3,569,838 | 3/1971 | Blair | 325—184 |
| 3,588,730 | 6/1971 | Schreuer | 331—25 |

HOWARD W. BRITTON, Primary Examiner

U.S. Cl. X.R.

331—18, 25